United States Patent Office 3,700,522
Patented Oct. 24, 1972

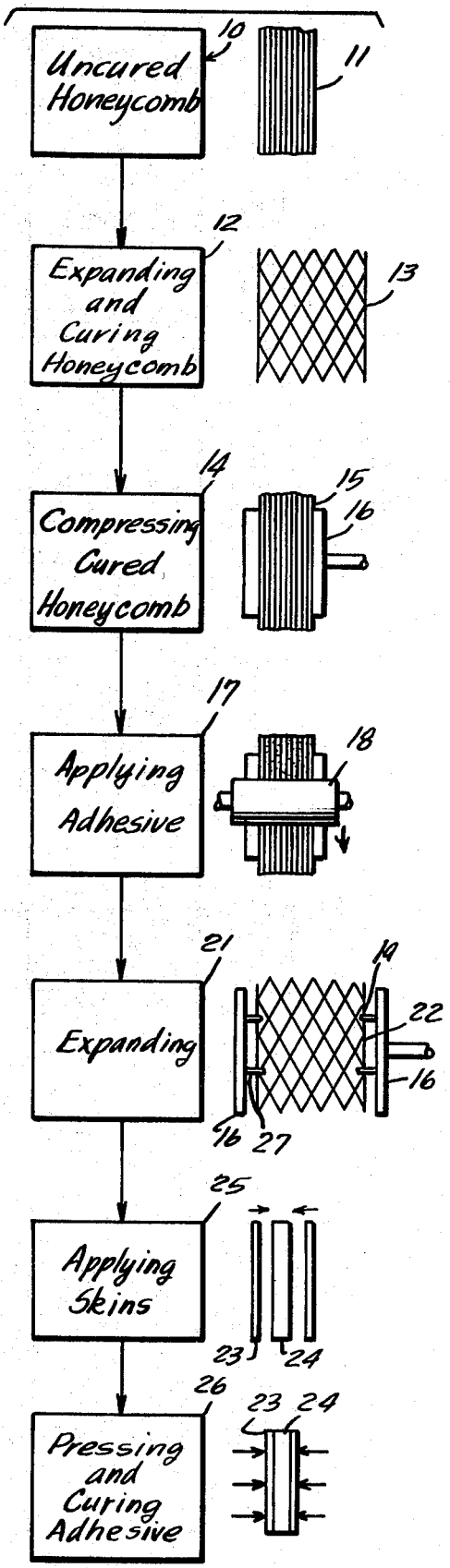

3,700,522
PROCESS OF MAKING HONEYCOMB PANELS
Clifford L. Wonderly, Orlando, Fla., assignor to Florida Gas Company, Winter Park, Fla.
Filed Dec. 3, 1970, Ser. No. 94,897
Int. Cl. B31d 3/02; B32b 3/12
U.S. Cl. 156—197
14 Claims

ABSTRACT OF THE DISCLOSURE

A honeycomb sandwich panel manufacturing process for applying an adhesive to the edges of paper honeycomb core material for the application of flat surfaces to the honeycomb. Paper honeycomb which has been expanded and cured is compressed and an adhesive is applied to the compressed honeycomb which is then caused to expand to its expanded position. The flat surfaces are applied and pressed to the two edges of the expanded honeycomb and the adhesive cured for securing the edge surfaces of the honeycomb to the flat surfaces to form the sandwich panel.

BACKGROUND OF THE INVENTION

The present invention relates to honeycomb sandwich panels and more particularly to a process for manufacturing honeycomb panels of the type using paper honeycomb.

In the past many types of honeycomb structures have been suggested in which honeycomb materials form the core for a pair of flat sandwiching surfaces. The honeycomb core is formed from thin ribbons of specially treated paper, reinforced plastic, aluminum, steel and other like materials, which ribbons are arranged symmetrically in repetitive cell-like patterns and are supported relative to each other in a continuous bonded structure. The honeycomb pattern may be of hexagonal, square, or other cross-section, or the cores may be of web or truss-type construction. The honeycomb sandwiches are formed with these cores secured between a pair of flat surfaces, face plates, or skins, and these surfaces when attached to the honeycomb may act as prime load bearing members providing good surface stabilization and compressional strength. The honeycomb structure permits very high strength to weight ratios with excellent stiffness, vibration dampening, thermal and acoustic properties over a wide range of requirements by varying the type of honeycomb core and changing the surfaces attached to the core. Honeycomb cores and sandwiches have been widely used in the aircraft and missile applications where compressive strengths to weight ratios are desirable and have more recently come into wide use as a building material for mobile and modular homes where the advantage of being light and strong while providing insulation has proved to be advantageous, and for these latter purposes special paper honeycombs have been developed which can be impregnated with a resin and packed with the honeycomb core material flattened or in an unexpanded position. This material can then be expanded and the resin therein cured such as by the utilization of heat, to give a stiff expanded honeycomb core for placement between a pair of surface skins. Honeycomb structure so constructed provides a relatively inexpensive yet strong panel with desirable insulation features for use in a building structure.

One of the problems encountered in prior art methods of assembling honeycomb panels of this type has been the alignment of surface panels with the honeycomb core since the panels are frequently pre-sized sheets of plywood or similar material and the honeycomb is provided in a standard width to match this particular type panel, such as 4 x 8 sheets of plywood. Another problem has been in the gluing operation and applying the adhesive to the honeycomb for attaching the panels. In prior art methods it was common to apply an adhesive covering one side of the surfaces to be applied to the honeycomb core. This resulted in a great waste of adhesives since only a small portion of adhesives was actually touching the edges of the honeycomb when the surface was applied, and if, alternatively, adhesive was applied to the honeycomb, it was difficult to apply properly to accumulate enough adhesive on the knife edge of the honeycomb without allowing the adhesive to run down into the honeycomb, again wasting large amounts of adhesive. This in turn increased the expense of the panel or required using less expensive adhesives reducing the quality of the bond between the surfaces of the honeycomb core.

The present invention advantageously provides a method for making honeycomb panels to which the adhesive may be applied in a uniform manner to the honeycomb core structure for attaching the sandwiching surfaces and which advantageously utilized a smaller amount of adhesive than has heretofore been possible allowing the utilization of higher quality adhesives to obtain stronger bonds between the sandwiching surfaces and the honeycomb core.

SUMMARY OF THE INVENTION

The present invention relates to a process of making honeycomb sandwich panels in which a resin impregnated paper honeycomb core material is expanded, and the resin cured with the honeycomb in an expanded position. This core may be cut to size prior to curing in its expanded position. Following curing the resin impregnated honeycomb, the expanded honeycomb is compressed back into its normally unexpanded position and held in this position while an adhesive is applied to one or both sides of its surface. The honeycomb core material is then caused to expand back to its expanded position leaving the adhesive coating on its edges. Surfaces are applied to one or both sides of the honeycomb core material to form the honeycomb panels. The surfaces may be pressed onto the core material during curing of the adhesive. Pressure and/or heat may be required for curing both the resin impregnated in the honeycomb and the adhesive applied to the honeycomb core.

BRIEF DESCRIPTION OF THE DRAWINGS

Other objects, features and advantages of this invention will be apparent from the written description and the drawings in which the figure illustrates a process flow diagram.

DESCRIPTION OF THE PREFERRED EMBODIMENT

Referring now to the drawing, the flow diagram is illustrated having an input of uncured honeycomb 10 shown in an unexpanded or folded position 11, and which generally is already impregnated with a resin for curing in the expanded position. The next step is expanding and curing 12 in the expanded position 13. Curing would usually require the application of heat, depending upon the type of resin utilized. The honeycomb core material becomes stiff upon curing the resins and is less easily compressible and expandable in an accordion-like fashion as had been the case when the resin was not cured. Typically this type of honeycomb is expanded to cure the resin, at which time the honeycomb remains in its expanded position. Compressing the cured honeycomb 14 is the next step in the present process so that the honeycomb will appear at 15 similar to the uncured honeycomb at 11, but requires compression by plates 16 to hold the honeycomb in the compressed position. If the force is removed from the honeycomb 15, it will immediately expand partially to its expanded position 13. Applying the adhesive 17 is accomplished such as by roller 18 rolling the adhesive 20 onto the edges of the honeycomb 15 but this could be accomplished by brushes, sprays or any other means desired without departing from the spirit and scope of the invention. In this compressed position the adhesive 20 is applied only to the edges of the honeycomb core material 15, rather than coating the entire surface of the surface materials or allowing large amounts of adhesive to flow in between the cells of the honeycomb as has been the case in the past. The force is removed and the honeycomb is allowed to expand 21, which expanded honeycomb 22 is of the same shape and size as 13 except for having the adhesive on the edges of the cells of the honeycomb. Under some conditions the honeycomb must be pulled out to the fully expanded position with hooks on the plates 16. Generally adhesives used with honeycombs require that the skins or sandwiching surfaces be applied within a predetermined length of time for the best bonding of the surfaces to the honeycomb core. Thus the honeycomb core 24 with the adhesive applied will generally be aligned with the surfaces 23 during the step 25 of applying the skins. Curing the adhesive 26 to complete the bonding of the skins 23 to core 24 may be performed individually or the assembled panels may be stacked and cured in groups by the group application of heat and pressure or for a period of time at room temperature. Core 24 is shown having the panels applied in a sandwich-like fashion and being compressed in the step 26. The pressing and curing of the adhesive may be done in presses placed in ovens for heating and curing the adhesive, or it may be done at room temperature with sufficient time in the press or it may be done with fast drying techniques such as by utilizing microwaves or macrowave radio frequencies. It has been found by the inventor that the resin impregnated paper honeycomb as illustrated in the present invention can be compressed after it is cured and then re-expanded without impairment of the effectiveness of the honeycomb core material. It is of course understood that certain types of honeycomb might not be compressible in this manner or might require additional force to re-expand the honeycomb to the original expanded shape and this is anticipated to be within the scope of this invention. Other adhesive materials, as well as other types and designs of honeycomb may be used in the present process which is limited only by the claims herein. Adhesive herein is intended to mean materials used in binding one object to another and include urea-formaldehyde resins, polyurethane resins, rubber or neoprene mastics or contact adhesives, epoxy resins and other thermoplastic or thermosetting synthetic resins. Honeycomb is anticipated as including various cell designs including hexagonal, diamond, square, and the like. Finally, if desired, adhesives could also be applied to the skins as well as to the honeycomb even though this is not found to be necessary in most applications unless a contact adhesive system were used.

This invention is not to be construed as limited to the particular forms disclosed herein since these are to be regarded as illustrative rather than restrictive.

I claim:
1. The process of making honeycomb panels comprising the steps of compressing honeycomb; applying adhesive to the edges of the compressed honeycomb; expanding said honeycomb; and applying a surface to at least one side of said honeycomb having adhesive thereon.
2. The method in accordance with claim 1 but including the step of curing said adhesive whereby said surface is attached to said honeycomb.
3. The method in accordance with claim 2 in which said step of applying a surface includes sandwiching honeycomb between a pair of surfaces.
4. The method according to claim 3 but including the step of applying pressure to said surfaces against said honeycomb.
5. The process according to claim 4 but including the step of aligning said surfaces with said honeycomb prior to sandwiching said surfaces to said honeycomb.
6. The process according to claim 5 in which a folded resin impregnated paper honeycomb material is expanded and cured prior to compressing said honeycomb.
7. The process according to claim 6 including the step of coating one side of each of said pair of surfaces with said adhesive material.
8. A method of making honeycomb panels comprising the steps of: expanding flattened resin impregnated honeycomb material; curing the resin in said resin impregnated honeycomb material forming cells therein, compressing said expanded and cured honeycomb material to flatten said cells; applying adhesive to said flattened honeycomb material; expanding said honeycomb material to provide a honeycomb material having adhesive applied substantially only on the edges of the cells thereof.
9. The method according to claim 8 but including the step of sandwiching said honeycomb material having adhesive on its edges between a pair of surfaces.
10. The process according to claim 9 but including the step of curing said adhesive to bond said surface to said honeycomb.
11. The process according to claim 10 but including the step of aligning said surfaces with said honeycomb prior to sandwiching them together.
12. The process according to claim 11 in which a group of panels sandwiching honeycomb between surface are stacked for simultaneous curing of the adhesive.
13. The process according to claim 12 including coating one side of each of said pair of surfaces with said adhesive material.
14. The process in accordance with claim 8 in which said step of expanding said honeycomb material includes removably attaching expanding means thereto and expanding to a predetermined position.

References Cited
UNITED STATES PATENTS
3,091,998  6/1963  Wehr et al. _____ 264—45

WILLIAM J. VAN BALEN, Primary Examiner

U.S. Cl. X.R.
161—68